(12) United States Patent
Ren et al.

(10) Patent No.: US 11,382,255 B1
(45) Date of Patent: Jul. 12, 2022

(54) METHOD AND SYSTEM FOR STORING EMISSION RIGHTS FOR POINT AND NONPOINT SOURCE POLLUTION BASED ON INTERNET OF THINGS

(71) Applicant: ZHEJIANG PROVINCE ECO-ENVIRONMENTAL LOW-CARBON DEVELOPMENT CENTER, Zhejiang (CN)

(72) Inventors: Yanhong Ren, Zhejiang (CN); Wenxiang Cai, Zhejiang (CN); Lei Fu, Zhejiang (CN); Zhou Zhou, Zhejiang (CN); Yun Huang, Zhejiang (CN); Aiju You, Zhejiang (CN); Bofu Zheng, Zhejiang (CN); Qunzhao Deng, Zhejiang (CN)

(73) Assignee: ZHEJIANG PROVINCE ECO-ENVIRONMENTAL LOW-CARBON DEVELOPMENT CENTER, Zhejiang (CN)

( * ) Notice: Subject to any disclaimer, the term of this patent is extended or adjusted under 35 U.S.C. 154(b) by 0 days.

(21) Appl. No.: 17/465,870

(22) Filed: Sep. 3, 2021

(30) Foreign Application Priority Data

Feb. 9, 2021 (CN) .......................... 202110173753.2

(51) Int. Cl.
*H04L 67/12* (2022.01)
*A01B 79/00* (2006.01)
(Continued)

(52) U.S. Cl.
CPC ............ *A01B 79/005* (2013.01); *G16Y 10/05* (2020.01); *G16Y 20/10* (2020.01); *G16Y 40/10* (2020.01); *G16Y 40/35* (2020.01); *H04L 67/12* (2013.01)

(58) Field of Classification Search
CPC ...... A01B 79/005; G16Y 20/10; G16Y 40/10; G16Y 40/35; G16Y 10/05; H04L 67/12
See application file for complete search history.

(56) References Cited

U.S. PATENT DOCUMENTS

| 7,873,552 | B2 * | 1/2011 | Campo ............. G06Q 10/0631 |
| | | | 705/30 |
| 7,974,853 | B1 * | 7/2011 | Zimmerman .......... G06Q 10/04 |
| | | | 705/7.11 |
| 2021/0269342 | A1 * | 9/2021 | Lee ...................... B01D 29/356 |

FOREIGN PATENT DOCUMENTS

| CN | 101045585 A | 10/2007 |
| CN | 102285719 A | 12/2011 |

(Continued)

*Primary Examiner* — Toan M Le
*Assistant Examiner* — Xiuqin Sun
(74) *Attorney, Agent, or Firm* — Yue Robert Xu; Apex Attorneys at Law, LLP

(57) ABSTRACT

A method for storing emission rights for point and nonpoint source pollution based on internet of things is provided. In the method, agricultural nonpoint source pollution is monitored based on internet of things; monitoring data of the agricultural nonpoint source pollution is collected and processed; data on migration of the agricultural nonpoint source pollution is analyzed, and an emission reduction amount of storable nonpoint source pollution of the agricultural nonpoint source pollution is calculated; and the emission reduction amount of storable nonpoint source pollution is added to a regional emission rights storage system as reserve emission rights. In this way, the emission reduction amount of nonpoint source pollution can be allocated to industrial point source pollution, and it is possible to combine agricultural nonpoint source pollution emission reductions and industrial point source pollution emissions, to achieve free distribution therebetween.

4 Claims, 3 Drawing Sheets

(51) Int. Cl.
*G16Y 10/05* (2020.01)
*G16Y 40/10* (2020.01)
*G16Y 20/10* (2020.01)
*G16Y 40/35* (2020.01)

(56) References Cited

FOREIGN PATENT DOCUMENTS

| | | | |
|---|---|---|---|
| CN | 103577640 A | | 2/2014 |
| CN | 104143048 A | | 11/2014 |
| CN | 104281975 A | | 1/2015 |
| CN | 107879556 A | | 4/2018 |
| CN | 108733915 A | | 11/2018 |
| CN | 110514246 A | * | 11/2019 |
| CN | 110514246 A | | 11/2019 |
| CN | 110544192 A | | 12/2019 |
| CN | 112215495 A | * | 1/2021 |

* cited by examiner

METHOD AND SYSTEM FOR STORING EMISSION RIGHTS FOR POINT AND NONPOINT SOURCE POLLUTION BASED ON INTERNET OF THINGS

CROSS REFERENCE OF RELATED APPLICATION

The present disclosure claims priority to Chinese Patent Application No. 202110173753.2, titled "METHOD AND SYSTEM FOR STORING EMISSION RIGHTS FOR POINT AND NONPOINT SOURCE POLLUTION BASED ON INTERNET OF THINGS", filed on Feb. 9, 2021 with the China National Intellectual Property Administration, which is incorporated herein by reference in its entirety.

FIELD

The present disclosure relates to the technology field of pollution control, and in particular to a method and a system for storing emission rights for point and nonpoint source pollution based on internet of things.

BACKGROUND

Nonpoint source pollution is a phenomenon in which pollutants in the atmosphere and the earth's surface are brought into water body due to rainfall and surface runoff, to pollute water body. Nonpoint source pollution is a serious environmental problem in the world today which has become a main factor impeding the protection of water body. Agricultural nonpoint source pollution is a main source of nonpoint source pollution causing water body environmental pollution. In China, industrial pollution has been effectively controlled, and agricultural nonpoint source pollution has become a major type of pollution. The eutrophication trend of important lakes such as Taihu Lake, Chaohu Lake and Dianchi Lake is intensified, and the pollution sources of those lakes are mainly from agricultural nonpoint source pollution. According to results of the second national pollution source survey, in some cities in eastern China, agricultural nonpoint source pollution accounts for 40%-65% of total pollution. Thus, nonpoint source pollution has become a main factor affecting regional high-quality development, and how to control nonpoint source pollution effectively has become a crucial problem.

One objective of the water pollution prevention and control plan is to achieve continuous improvement of water environment quality of basins, and establish an integrated basin management and control system based on an integrated control of water body quality targets, the industrial pollution sources and agricultural pollution sources of basins. Thus, a total emission control of point and nonpoint source pollution based on a basin unit must be made. In China, the emission control of industrial pollution sources has been focused for long time. With the implementation of an emission permit system of the stationary pollution sources, emission standards of water quality will become stricter, the marginal emission reduction cost of industrial pollution sources will become higher, and thus the potential space for emission reduction is limited. In contrast, there are no strict control standards and mandatory emission reduction requirements for agricultural nonpoint source pollution, and thus the marginal emission reduction cost of agricultural nonpoint source pollution is relatively low, and the emission reduction space thereof is relatively large. The formation process and intensity of agricultural nonpoint source pollution are mainly affected by factors such as rainfall, land use types and so on. Thus, the agricultural nonpoint source pollution is relatively random and has a vague forming principle. In addition, the agricultural nonpoint source pollution is difficult to implement scientific management and effective control due to the lack of monitoring technology and the shortage of governance funds. In the conventional technology, the development of automatic sensing and monitoring technology has laid the foundation for the scientific implementation of quantitative monitoring of nonpoint source pollution. However, there is a lack of a comprehensive management and control system for agricultural nonpoint source pollution dynamic monitoring, accounting of total inflows, and a control and coordinated allocation of point and nonpoint source pollution.

SUMMARY

To solve the above problems, a method and a system for storing emission rights for point and nonpoint source pollution based on internet of things are provided according to embodiments of the present disclosure, to establish an integrated water environment management and high efficient co-governance system for basins to manage water quality, coordinate control of point and nonpoint source pollution, reduce pollution emission reduction costs, and improve environmental resource benefits. Therefore, the green development of agriculture is guaranteed and environmental capacity and resources are released, and the development of regional industries and the implementation of major livelihood projects are guaranteed. The overall benefit of society can be maximized at a lower emission reduction cost by utilizing the industrial development increments to assist nonpoint source pollution control.

A method for storing emission rights for point and nonpoint source pollution based on internet of things is provided according to an embodiment of the present disclosure. The method includes:

monitoring agricultural nonpoint source pollution based on internet of things;

collecting and processing monitoring data of the agricultural nonpoint source pollution;

analyzing data on migration of the agricultural nonpoint source pollution, and calculating an emission reduction amount of storable nonpoint source pollution of the agricultural nonpoint source pollution; and adding the emission reduction amount of storable nonpoint source pollution to a regional emission rights storage system as reserve emission rights.

Optionally, in the method for storing emission rights for point and nonpoint source pollution based on internet of things, the monitoring agricultural nonpoint source pollution based on internet of things includes:

setting up a monitoring point at a position where runoff of the agricultural nonpoint source pollution enters pollutant-holding water body, for different land usage type units; setting up a monitoring point at a position where the runoff of the agricultural nonpoint source pollution enters pollutant-holding water body, for sub-catchment areas; and marking the monitoring points on an electronic map;

determining a water quality monitoring project and a water quantity monitoring project, according to characteristics of nonpoint source pollution, main pollution factors of regional surface water, a total regional emissions control index, and a target of emission rights transaction; and determining a monitoring frequency according to whether there is precipitation, rainfall amount, surface runoff amount, and a water amount period.

Optionally, in the method for storing emission rights for point and nonpoint source pollution based on internet of things, the collecting and processing monitoring data of the agricultural nonpoint source pollution includes:

collecting data on temperature, pH value, dissolved oxygen, ammonia nitrogen, total nitrogen, total phosphorus, and flow of the agricultural nonpoint source pollution;

transmitting the data to an application layer; and summarizing, converting, analyzing, processing and displaying the data by means of large-scale parallel computing.

Optionally, in the method for storing emission rights for point and nonpoint source pollution based on internet of things, the analyzing data on migration of the agricultural nonpoint source pollution, and calculating an emission reduction amount of storable nonpoint source pollution of the agricultural nonpoint source pollution includes:

calculating an initial emission amount of water pollutants from the agricultural nonpoint source pollution into water body, based on a crop sown area, fertilizing amount per unit area, a pollutant loss coefficient and a pollutant inflow coefficient;

calculating a total load of the agricultural nonpoint source pollution by means of a direct measurement method or a dummy-load method; and obtaining the emission reduction amount of storable nonpoint source pollution of the agricultural nonpoint source pollution, by subtracting the total load of the agricultural nonpoint source pollution from the initial emission amount of water pollutants.

A system for storing emission rights for point and nonpoint source pollution based on internet of things is provided according to an embodiment of the present disclosure. The system includes:

a monitoring device configured to monitor agricultural nonpoint source pollution based on internet of things;

a collecting and processing device configured to collect and process monitoring data of the agricultural nonpoint source pollution;

an analysis and calculation device configured to analyze data on migration of the agricultural nonpoint source pollution, and calculate an emission reduction amount of storable nonpoint source pollution of the agricultural nonpoint source pollution; and an adding device configured to add the emission reduction amount of the storable nonpoint source pollution to a regional emission rights storage system as reserve emission rights.

Optionally, in the system for storing emission rights for point and nonpoint source pollution based on internet of things, the monitoring device includes:

a monitoring point setting component configured to set up a monitoring point at a position where runoff of the agricultural nonpoint source pollution enters pollutant-holding water body, for different land usage type units; set up a monitoring point at a position where the runoff of the agricultural nonpoint source pollution enters pollutant-holding water body, for sub-catchment areas; and mark the monitoring points on an electronic map;

a monitoring project determination component configured to determine a water quality monitoring project and a water quantity monitoring project according to characteristics of nonpoint source pollution, main pollution factors of regional surface water, a total regional emissions control index, and a target of emission rights transaction; and a monitoring frequency determination component configured to determine a monitoring frequency according to whether there is precipitation, rainfall amount, surface runoff amount, and a water amount period.

Optionally, in the system for storing emission rights for point and nonpoint source pollution based on internet of things, the collecting and processing device includes:

a data collecting component configured to collect data on temperature, pH value, dissolved oxygen, ammonia nitrogen, total nitrogen, total phosphorus, and flow of the agricultural nonpoint source pollution;

a transmission component configured to transmit the data to an application layer; and a processing component configured to summarize, convert, analyze, process and display the data by means of large-scale parallel computing.

Optionally, in the system for storing emission rights for point and nonpoint source pollution based on internet of things, the analysis and calculation device includes:

a calculation component for calculating an initial emission amount of water pollutants, configured to calculate the initial emission amount of water pollutants from the agricultural nonpoint source pollution into water body, based on a crop sown area, fertilizing amount per unit area, a pollutant loss coefficient and a pollutant inflow coefficient;

a calculation component for calculating a total load of the agricultural nonpoint source pollution, configured to calculate the total load of the agricultural nonpoint source pollution by means of a direct measurement method or a dummy-load method; and a calculation component for obtaining the emission reduction amount of storable nonpoint source pollution of the agricultural nonpoint source pollution, configured to obtain the emission reduction amount of storable nonpoint source pollution of the agricultural nonpoint source pollution, by subtracting the total load of the agricultural nonpoint source pollution from the initial emission amount of water pollutants.

In the method for storing emission rights for point and nonpoint source pollution based on internet of things according to embodiments of the present disclosure, agricultural nonpoint source pollution is monitored based on internet of things; monitoring data of the agricultural nonpoint source pollution is collected and processed; data on migration of the agricultural nonpoint source pollution is analyzed, and an emission reduction amount of storable nonpoint source pollution of the agricultural nonpoint source pollution is calculated; and the emission reduction amount of the storable nonpoint source pollution is added to a regional emission rights storage system. In this way, the emission reduction amount of nonpoint source pollution can be allocated to industrial point source pollution. Thus, agricultural nonpoint source pollution emission reductions can be combined with industrial point source pollution emissions, to achieve free distribution therebetween. Therefore, an integrated water environment management and high efficient co-governance system for basins is established, to manage water quality, coordinate point and nonpoint source pollution control, reduce pollution emission reduction costs, and improve environmental resource benefits. Therefore, the green development of agriculture is guaranteed and environmental capacity and resources are released, and the development of regional industries and the implementation of major livelihood projects are guaranteed. The overall benefit of society can be maximized at a lower emission reduction cost by utilizing the industrial development increments to assist nonpoint source pollution control. The system for storing emission rights for point and nonpoint source pollution based on internet of things according to embodiments of the present disclosure has similar advantages as the aforementioned method.

BRIEF DESCRIPTION OF THE DRAWINGS

In order to clearly describe the technical solutions in the embodiments of the present disclosure or conventional technology, drawings to be used in the description of the embodiments and conventional technology are briefly described hereinafter. It is apparent that the drawings described below show merely some embodiments of the present disclosure. Those skilled in the art may obtain other drawings according to the provided drawings without any creative effort.

DETAILED DESCRIPTION

A method and a system for storing emission rights for point and nonpoint source pollution based on internet of things are provided according to embodiments of the present disclosure, to establish an integrated water environment management and high efficient co-governance system for basins, to manage water quality, coordinate control of point and nonpoint source pollution, reduce pollution emission reduction costs, and improve environmental resource benefits. Therefore, the green development of agriculture is guaranteed and environmental capacity and resources are released, and the development of regional industries and the implementation of major livelihood projects are guaranteed. The overall benefit of society can be maximized at a lower emission reduction cost by utilizing the industrial development increments to assist nonpoint source pollution control.

The technical solutions in the embodiments of the present disclosure will be described clearly and completely hereinafter in conjunction with the drawings in the embodiments of the present disclosure. Apparently, the described embodiments are only a part of the embodiments of the present disclosure, rather than all embodiments. Based on the embodiments in the present disclosure, all of other embodiments, made by the person skilled in the art without any creative efforts, fall into the scope of protection of the present disclosure.

Figure 1:
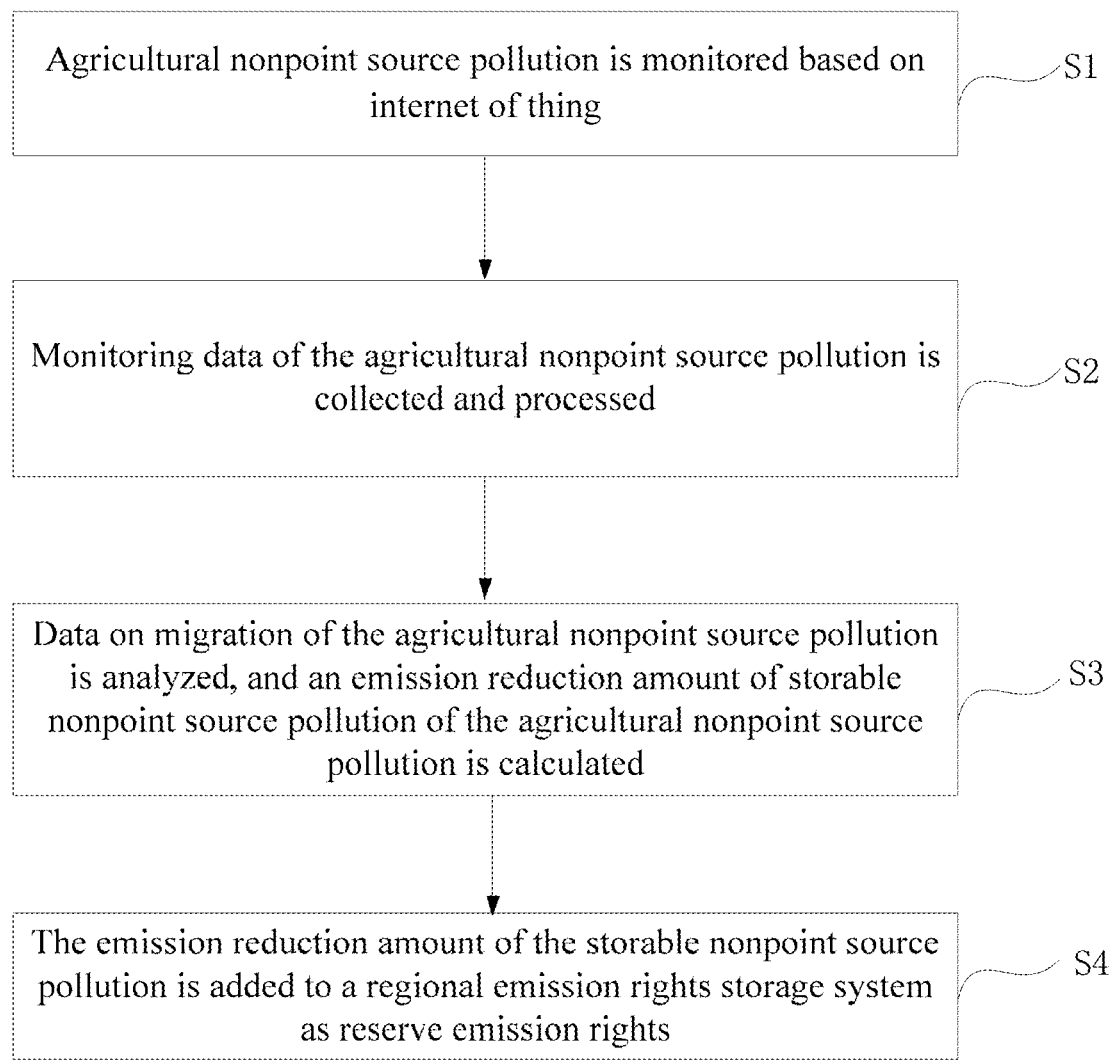
FIG. 1 is a schematic diagram of a method for storing emission rights for point and nonpoint source pollution based on internet of things according to an embodiment of the present disclosure.

A method for storing emission rights for point and nonpoint source pollution based on internet of things is provided according to an embodiment of the present disclosure. As shown in FIG. 1, the method includes following steps S1 to S4.

In step S1, agricultural nonpoint source pollution is monitored based on internet of thing.

A load of the agricultural nonpoint source pollution is calculated based on division of water environment area and on-site surveys, and status and spatio-temporal emission characteristics of the agricultural nonpoint source pollution in the basin, to reflect effects of nonpoint source pollution control in different aspects.

In step S2, monitoring data of the agricultural nonpoint source pollution is collected and processed.

The monitoring data of the agricultural nonpoint source pollution is collected, to objectively reflect situation of the agricultural nonpoint source pollution. Dynamic monitoring and tracking analysis of the agricultural nonpoint source pollution may be implemented, by an monitoring data collection and processing system for an agricultural nonpoint source pollution based on information fusion, internet of things and cloud computing technology.

In step S3, data on migration of the agricultural nonpoint source pollution is analyzed, and an emission reduction amount of storable nonpoint source pollution of the agricultural nonpoint source pollution is calculated.

A quantity analysis can be performed on a migration process of main pollutants of the agricultural nonpoint source pollution, by monitoring rainwater runoff as the carrier and power of the agricultural nonpoint source pollution and using different accounting methods such as a load estimation method, a direct measurement method, and a dummy-load method. In this way, a nature generation and an effect of emission reduction control of the agricultural nonpoint source pollution in the basin can be revealed.

In step S4, the emission reduction amount of the storable nonpoint source pollution is added to a regional emission rights storage system as reserve emission rights.

It should be noted that the establishment of an emission rights reserve system takes into account factors such as regional economic development, regulation and management of aggregate indicators, and macro-control of an emission rights transaction market. Thus, strategic emerging industries and major livelihood projects are supported according to the regional development strategy during the planning period. In addition, macro-control of the emission rights transaction market can be carried out, to ensure economic and social progress and the steady development of the emission rights transaction market. Reserve indicators mainly include three aspects. In the first aspect, some indicators reserved as emission rights reserve at an initial stage of planning indicators of industrial pollution source when a distributable indicator for the industrial pollution source is determined. In the second aspect, surplus emission rights of pollutant companies due to the implementation of cleaner production or improved end-of-line treatment technologies can be collected and purchased by the government. In the third aspect, emission reductions such as nonpoint source pollution caused by innovative management policies, standards or investment in infrastructure construction can be collected by the government.

The aforementioned emission reduction amount of nonpoint source pollution can be allocated to industrial point source pollution. When the emission rights is optimized and allocated, an optimal allocation method of emission rights based on an entropy weight method can be established, and an allocation method based on performance evaluation and an allocation method based on performance optimization can be combined. By comprehensively considering the status of regional ecological environment carrying capacity and an economic output performance level of emission rights of the enterprise, requirements of regional total emission control and water environment quality management can be satisfied, therefore promoting research and development of advanced emission control and environmental protection management technology, taking into account fairness and efficiency, and ensuring the maximum output of economic benefits of emission rights.

Integrated carbon-based organic fertilizers may be used to replace chemical fertilizers. Intelligent irrigation water and fertilizer coupling technology, and ecological ditch intercepting nitrogen and phosphorus technology are used to achieve comprehensive control of nitrogen and phosphorus loss from nonpoint source pollution in the planting industry. Through a nonpoint source emission reduction accounting module and an emission rights reserve module, the emission rights of nonpoint source pollution from the planting industry are optimized and allocated to industrial point source pollution. Finally, an integrated water environment management and high efficient co-governance system for basins is established, to manage water quality, coordinate control of point and nonpoint source pollutions, reduce pollution emission reduction costs, and improve environmental resource benefits. Therefore, the flexibility of the emission rights transaction market can be fully utilized to solve the problem of limited potential for industrial point source emission reduction currently. In addition, the maximum emission reduction from nonpoint source pollution with the optimal emission reduction cost is achieved. It not only solves the problem of the difficulty in exploring the potential of industrial point source emission reductions in the current region, but also realizes the maximum emission reduction of nonpoint source with the optimal emission reduction cost. On the basis of ensuring the improvement of water environment quality, the implementation of regional strategic emerging industries and people's livelihood projects are ensured; and the continuous emission reduction of nonpoint source pollution and the construction of a dynamic monitoring system are promoted through industrial development increments, therefore promoting environmental quality protection and high-quality economic development.

In the method for storing emission rights for point and nonpoint source pollution based on internet of things according to embodiments of the present disclosure, agricultural nonpoint source pollution is monitored based on internet of things; monitoring data of the agricultural nonpoint source pollution is collected and processed; data on migration of the agricultural nonpoint source pollution is analyzed, and an emission reduction amount of storable nonpoint source pollution of the agricultural nonpoint source pollution is calculated; and the emission reduction amount of the storable nonpoint source pollution is added to a regional emission rights storage system. In this way, nonpoint source emission reductions can be allocated to industrial point source pollution emission reductions. Thus, agricultural nonpoint source pollution emission reductions can be combined with industrial point source pollution emissions, to achieve free distribution therebetween. Therefore, an integrated water environment management and high efficient co-governance system for basins is established, to manage water quality, coordinate point and nonpoint source pollution control, reduce pollution emission reduction costs, and improve environmental resource benefits. Therefore, the green development of agriculture is guaranteed and environmental capacity and resources are released, and the development of regional industries and the implementation of major livelihood projects are guaranteed. The overall benefit of society can be maximized at a lower emission reduction cost by utilizing the industrial development increments to assist nonpoint source pollution control.

In one embodiment of the method for storing emission rights for point and nonpoint source pollution based on internet of things, the step of monitoring agricultural nonpoint source pollution based on internet of things includes following steps.

Monitoring points are set up at a position where runoff of the agricultural nonpoint source pollution enters pollutant-holding water body, for different land usage type units; monitoring points are set up at a position where the runoff of the agricultural nonpoint source pollution enters pollutant-holding water body, for sub-catchment areas; and the monitoring points are marked on an electronic map. The monitoring points are set up according to principles of representativeness, scientificity and convenience.

A water quality monitoring project and a water quantity monitoring project are determined according to characteristics of nonpoint source pollution, main pollution factors of regional surface water, a total regional emissions control index, and a target of emission rights transaction. The purpose of this step is to reflect the emission of regional nonpoint source pollution of organic matter such as nitrogen and phosphorus, and a change of an oxygen balance system in water environment. The water quality monitoring project mainly includes conventional items and specific items. The conventional items generally include suspended solids, pH value, conductivity, $COD_{Mn}$, ammonia nitrogen, total nitrogen, and total phosphorus, etc. The specific items refer to harmful pollutants selected according to the actual situation of the region and having a greater hazard, such as heavy metals and so on. The water quantity monitoring project generally includes runoff flow, velocity and duration. A flow meter may be used in the water quantity monitoring process, and a hydrometric propeller may be used in a velocity monitoring process.

A monitoring frequency is determined according to whether there is precipitation, rainfall amount, surface runoff, and a water amount period. The monitoring frequency is determined in accordance with the following three principles. The first principle is that a monitoring process is performed every time it rains since the agricultural nonpoint source pollution is caused by rainfall. The second principle is that monitoring of the rainfall amount, the surface runoff and runoff water quality during precipitation is carried out simultaneously. The third principle is that different monitoring frequencies are set during a high flow period, and during a normal and low water period. A low monitoring frequency is selected during the normal and low water period due to stable emission of runoff; and a high monitoring frequency is selected in the high water period due to long time of runoff and rapid changes in pollutant erosion with the runoff. The monitoring process should be performed more than three times before the peak of runoff; and should also be performed more than three times in a gradual decrease process in flow after the peak of runoff, to objectively reflect the changes in water quality and water quantity in the entire runoff process of the basin.

In one embodiment of the method for storing emission rights for point and nonpoint source pollution based on internet of things, the step of collecting and processing monitoring data of the agricultural nonpoint source pollution includes:

collecting data on temperature, pH value, dissolved oxygen, ammonia nitrogen, total nitrogen, total phosphorus, and flow of the agricultural nonpoint source pollution;

transmitting the data on temperature, pH value, dissolved oxygen, ammonia nitrogen, total nitrogen, total phosphorus, and flow of the agricultural nonpoint source pollution to an application layer; and summarizing, converting, analyzing, processing and displaying the data on temperature, pH value, dissolved oxygen, ammonia nitrogen, total nitrogen, total phosphorus, and flow of the agricultural nonpoint source pollution, by means of large-scale parallel computing.

Figure 2:
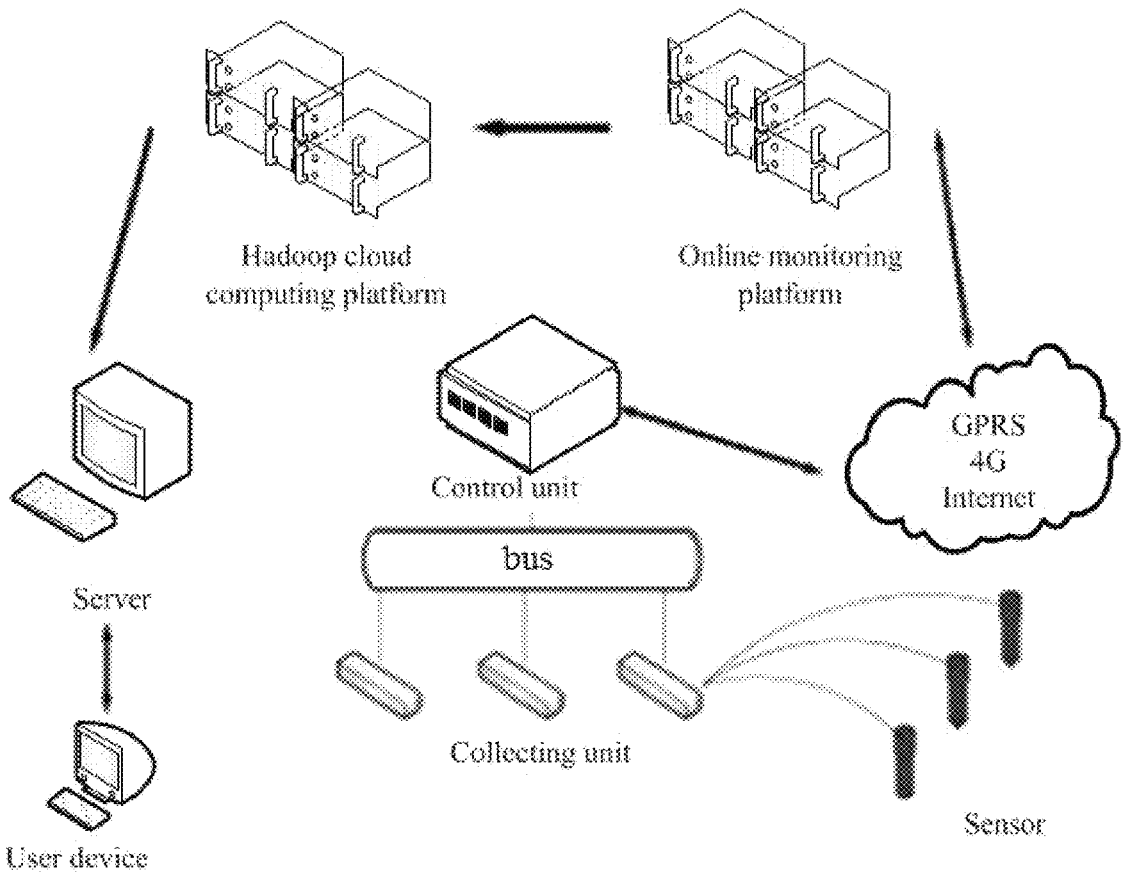
FIG. 2 is a schematic diagram of a monitoring system and a data collecting and processing system for agricultural nonpoint source pollution according to an embodiment of the present disclosure.

As shown in FIG. 2, architecture of a monitoring and data collection and processing system for agricultural nonpoint source pollution includes an application layer, a transmission layer and a perception layer. Public technologies such as security technology and network management are applied in all of the three layers, to ensure the accuracy, robustness and safety of data. The application layer is configured to summarize, convert, analyze, process and display data. The application layer includes two sublayers, that is, a supporting platform sublayer and an application service sublayer. The supporting platform sublayer provides common basic services, such as data processing, sharing and intercommunication, and resource calling interfaces for the application service sublayer; classifies and stores information obtained by the transmission layer; and processes the data by utilizing a large-scale parallel computing function. The application service sublayer realizes functions such as real-time monitoring, information management, real-time early warning and intelligent decision-making on the basis of the supporting platform sublayer. The transmission layer is configured to transmit information collected by the perception layer to the application layer safely and reliably. The perception layer is configured to reflect the comprehensive perception characteristics of internet of things, that is, to obtain, by means of various intelligent sensing devices and sensor nodes, required monitoring point information, such as data on temperature, pH, dissolved oxygen, ammonia nitrogen, total nitrogen, total phosphorus, and flow, anytime and anywhere. A monitoring system of an agricultural nonpoint source pollution based on ASP.NET+SQL SERVER has functions such as data collection, information query, and pollution load monitoring, which has complete functions, friendly interface, and good performance. The functions of the monitoring system can meet the needs of agricultural nonpoint source pollution monitoring. An RUP-based system development process has phases of requirement capture, analysis, design, implementation, and testing, and each phase is developed incrementally and iteratively. The requirement capture phase is mainly used for case modeling and collection of requirements that have a significant impact on the architecture. The analysis phase is mainly used for converting the requirements into an analysis model. The design phase is mainly used for expanding the analysis model and transforming the analysis model to feasible technical realization plans based on implementation environment. The implementation phase is mainly used for creating source codes and executable codes, as well as component modules for deployment, based on design contents. The testing phase is mainly used for verifying the work completed in the implementation phase. The Hadoop cloud computing platform is adopted in the system, the core content of which includes a distributed file system (HDFS) providing distributed storage capabilities of each node and having super data backup and fault tolerance to ensure data security. In addition, the Map-Reduce distributed computing platform is also adopted in the system. Large-scale data mining and processing by using a framework of the MapReduce distributed computing platform. Monitoring data obtained by a collecting unit, i.e., sensors, of the perception layer is transmitted to an online monitoring platform by a control unit through a wireless transmission component (GPRS, 4G or Internet), and then enters the data receiving platform deployed on the Web server through the Hadoop cloud computing platform. The system communicates with the cloud computing platform through interfaces. Through the interfaces, the Hadoop cloud computing platform provides MapReduce computing services and data storage services, to support data storage and analysis functions of front-end applications.

In view of the fact that abnormal data, generated in a data collection process due to mechanical or human factors, may reduce the monitoring accuracy and information fusion accuracy, an improved fuzzy C-means clustering algorithm can be used to preprocess original collected data by removing the abnormal data and redundant information. Clustering center points are obtained as an integrated input sample set, which improves the accuracy. Furthermore, information fusion technology is adopted to provide different information sources related to nonpoint source pollution, thereby eliminating the redundancy and contradictions between multi-source information, forming complete perception and description of agricultural nonpoint source pollution environment, and improving the efficiency of agricultural nonpoint source pollution monitoring and response decision-making. Internet of Things is combined with cloud computing technology. The cloud computing technology, due to its powerful processing power, storage capacity and high cost performance, can solve problems such as a high operating cost, a limited service scale and limited performance in agricultural nonpoint source pollution monitoring, thereby ensuring the promotion and popularization of agricultural nonpoint source pollution monitoring.

In one embodiment of the method for storing emission rights for point and nonpoint source pollution based on internet of things, the step of analyzing data on migration of the agricultural nonpoint source pollution, and calculating an emission reduction amount of storable nonpoint source pollution of the agricultural nonpoint source pollution includes following steps.

An initial emission amount of water pollutants from the agricultural nonpoint source pollution into water body is calculated based on a crop sown area, fertilizing amount per unit area, a pollutant loss coefficient and a pollutant inflow coefficient.

Specifically, taking total nitrogen as an example, before the implementation of agricultural nonpoint source fertilization methods, types of fertilization, and nitrogen and phosphorus terminal control and emission reduction projects, a formula for calculating the emission amount of water pollutants from the agricultural nonpoint source pollution into water body is as the following formula (1):

$$P_0 = \sum P_{ij} = \sum_{}^{m} \sum_{}^{n} (A_{ij} \times F_{ij} \times e_{ij} \times \lambda_{ij} \times 10^{-3}) \quad (1)$$

where:

$P_0$ is represented as a total emission amount of water pollutants from agricultural nonpoint source pollution into water body in a region, the unit of which is kg/a or t/a;

$P_{ij}$ is represented as an emission amount of water pollutants from the j-th category of crops in the i-th subarea into water body in a region, the unit of which is kg/a or t/a;

$A_{ij}$ is represented as a planting area of the j-th category of crops in the i-th subarea, the unit of which is ha or km$^2$;

$F_{ij}$ is represented as an amount of fertilizer applied per unit area of the j-th category of crops in the i-th subarea, the unit of which is kg/(ha·a) or t/(km$^2$·a);

$e_{ij}$ is represented as a pollutant loss coefficient of the j-th category of crops in the i-th subarea (%); and $\lambda_{ij}$ is represented as a pollutant inflow coefficient of the j-th category of crops in the i-th subarea.

The total load of the agricultural nonpoint source pollution is calculated by means of a direct measurement method or a dummy-load method.

Specifically, the direct measurement method refers to a "section method". That is, the basin is divided into multiple pollutant-holding sections corresponding to a small catchment area of the basin according to the flow change rate of the basin. The water body monitoring sections are set. A total load of the agricultural nonpoint source pollution in whole basin is calculated based on an average concentration of representative pollutants in each section and corresponding runoff by the following formula (2):

$$p = \sum_{i=1}^{n} C_i Q_i. \qquad (2)$$

where:

P is represented as a total load amount of representative pollutant of the agricultural nonpoint source pollution in each monitoring section of the basin, the unit of which is kg/a or t/a;

$C_i$ is represented as an average pollution concentration of a representative pollutant in the i-th monitoring section, the unit of which is mg/L;

$Q_i$ is represented as a runoff amount monitored in the i-th monitoring section, the unit of which is m$^3$/s;

i is represented as the i-th monitoring section in the basin; and n is represented as the total number of monitoring sections in the basin.

The above dummy-load method includes following steps. A long-term observation is performed on a pollution load of a catchment area in a land of a single land usage type in the basin. The pollution load is divided by the number of monitoring years and the area of the catchment area, to obtain a pollution load in a unit area per unit time in a land of a certain land usage type, and the unit thereof is kg/ha·a. By multiplying the pollution load in a unit area per unit time in a land of a certain land usage type by the total area of the land, a total load of the agricultural nonpoint source pollution in the land is calculated, and a formula for calculating the total load of the agricultural nonpoint source pollution in the land is as the following formula (3):

$$p = \sum_{j=1}^{m} X_j A_j \qquad (3)$$

where:

P is represented as a total load amount of nonpoint source pollution (a certain pollutant) in lands of various land usage types in a catchment area of the basin, the unit of which is kg/a or t/a;

$X_j$ is represented as a unit load in a land of the j-th land usage type, the unit of which is kg/(ha·a) or t/(km$^2$·a);

$A_j$ is represented as a total area of a land of the j-th land usage type, the unit of which is ha or km$^2$;

j is represented as the j-th land usage type; and m is represented as the total number of land usage types (that is, i=1, 2, 3 . . . m).

This method is mainly used for long-term estimation in a relatively stable regional environment. It should be avoided that a single event is used to estimate the unit load. Different unit loads are determined in different regions based on actual survey and analysis results. The unit load of a certain area cannot be extended to other areas. The dummy-load method is mainly used to basins having a large area, many sub-catchments and poor monitoring conditions.

The emission reduction amount of storable nonpoint source pollution of the agricultural nonpoint source pollution is obtained by subtracting the total load of the agricultural nonpoint source pollution from the initial emission amount of water pollutants.

Specifically, to ensure continuous improvement and stable compliance with the standard of regional surface water environment quality, differentiated collection and storage combined with the regional water environment carrying capacity is performed. For an overload area of water environment carrying capacity, the storable ratio is set according to the overload situation. The emission reduction amount of the storable nonpoint source pollution of the agricultural nonpoint source pollution and the storable ratio are calculated as shown in following formulas (4) and (5):

$$P_{sa} = \beta \times (P_0 - P) \qquad (4)$$

$$\beta = \begin{Bmatrix} 1 \\ C_0/C_1 \end{Bmatrix} \begin{matrix} C_1 \leq C_0 \\ C_1 > C_0 \end{matrix} \qquad (5)$$

where:

$P_{sa}$ is represented as an emission reduction amount of a storable nonpoint source pollution in a region, the unit of which is kg/a or t/a;

$\beta$ is represented as a storable ratio of an emission reduction amount of agricultural nonpoint source pollution;

$C_0$ is represented as an allowable emission capacity into a river or pollutant holding capacity in a region, the unit of which is kg/a or t/a; and $C_1$ is represented as an actual emission amount into river or current situation of sewage discharge, the unit of which is kg/a or t/a.

In an embodiment of the method for storing emission rights for point and nonpoint source pollution based on internet of things, the step of adding the emission reduction amount of the storable nonpoint source pollution to a regional emission rights storage system as reserve emission rights includes the following steps.

The emission reduction amount of the storable nonpoint source pollution is added to current reserve emission rights of the regional emission rights storage system, or an initial allocation reserve of emission rights is added to surplus emissions rights of industrial point source pollution repurchased by the government, to obtain updated reserve emission rights of the regional emission rights storage system.

The reserve emission rights of the regional emission rights storage system is calculated according to the following formula (6):

$$E_r = E_{r0} + E_{bi} + P_{sa} \quad (6)$$

where:

$E_r$ is represented as the reserve emission rights of the regional emission rights storage system, the unit of which is kg/a or t/a;

$E_{r0}$ is represented as an initial allocation reserve of emission rights, the unit of which is kg/a or t/a;

$E_{bi}$ is represented as surplus emission rights of industrial point source pollution repurchased by the government, the unit of which is kg/a or t/a; and $P_{sa}$ is represented as the emission reduction amount of storable nonpoint source pollution in a region, the unit of which is kg/a or t/a.

Furthermore, a regional annual emission reduction task may be subtracted from the reserve emission rights of a regional emission rights storage system, to obtain a result. The result is multiplied by (1–§) to obtain a dynamic allocable amount of regional emission rights, where § is an adjustment coefficient of reserve emission rights storage amount. Then, the dynamic allocable amount of the regional emission rights is allocated to the industrial point source pollution.

Specifically, the dynamic allocable amount of the regional emission rights is calculated according to the following formula (7):

$$Q_0 = (E_r - P_d) \times (1 - §) \quad (7)$$

where:

$Q_0$ is represented as the dynamic allocable amount of the regional emission rights in a planning period, the unit of which is kg/a or t/a;

$P_d$ is represented as a regional annual emission reduction task in a current year, the unit of which is kg/a or t/a; and § is represented as an adjustment coefficient of reserve emission rights storage amount, which is usually 2%-5% in combination with the regional industrial development plan in consideration of guarantee of major and urgent people's livelihood projects in the region.

Figure 3:
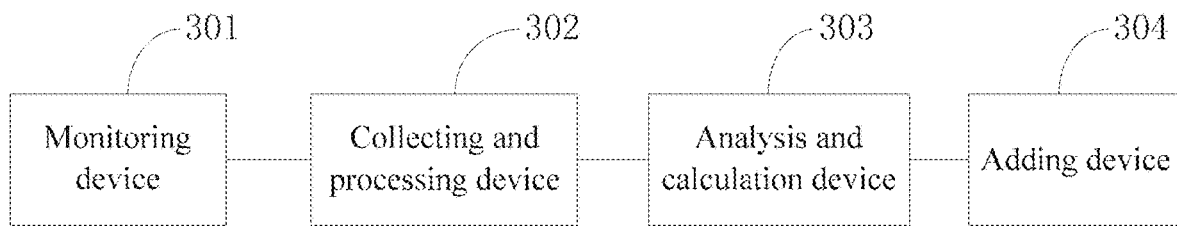
FIG. 3 is a schematic diagram of a system for storing emission rights for point and nonpoint source pollution based on internet of things according to an embodiment of the present disclosure.

A system for storing emission rights for point and nonpoint source pollution based on internet of things is provided according to an embodiment of the present disclosure. As shown in FIG. 3, the system includes a monitoring device 301, a collecting and processing device 302, an analysis and calculation device 303, and an adding device 304.

The monitoring device 301 is configured to monitor agricultural nonpoint source pollution based on internet of things. A load of the agricultural nonpoint source pollution is calculated based on division of water environment area and on-site surveys, and status and spatio-temporal emission characteristics of the agricultural nonpoint source pollution in the basin, to reflect effects of nonpoint source pollution control in different aspects.

The collecting and processing device 302 is configured to collect and process monitoring data of the agricultural nonpoint source pollution. The monitoring data of the agricultural nonpoint source pollution is collected, to objectively reflect situation of the agricultural nonpoint source pollution. Dynamic monitoring and tracking analysis of the agricultural nonpoint source pollution may be implemented, by an monitoring data collection and processing system for an agricultural nonpoint source pollution based on information fusion, Internet of Things and cloud computing technology.

The analysis and calculation device 303 is configured to analyze data on migration of the agricultural nonpoint source pollution, and calculate an emission reduction amount of storable nonpoint source pollution of the agricultural nonpoint source pollution. A quantity analysis can be performed on a migration process of main pollutants of the agricultural nonpoint source pollution, by monitoring rainwater runoff as the carrier and power of the agricultural nonpoint source pollution and using different accounting methods such as a load estimation method, a direct measurement method, and a dummy-load method. In this way, a nature generation and an effect of emission reduction control of the agricultural nonpoint source pollution in the basin can be revealed.

The adding device 304 is configured to add the emission reduction amount of the storable nonpoint source pollution to a regional emission rights storage system as reserve emission rights. It should be noted that the establishment of an emission rights reserve system takes into account factors such as regional economic development, regulation and management of aggregate indicators, and macro-control of an emission rights transaction market. Thus, strategic emerging industries and major livelihood projects are supported according to the regional development strategy during the planning period. In addition, macro-control of the emission rights transaction market can be carried out, to ensure economic and social progress and the steady development of the emission rights transaction market. Reserve indicators mainly include three aspects. In the first aspect, some indicators reserved as emission rights reserve at an initial stage of planning indicators of industrial pollution source when a distributable indicator for the industrial pollution source is determined. In the second aspect, surplus emission rights of pollutant companies due to the implementation of cleaner production or improved end-of-line treatment technologies can be collected and purchased by the government. In the third aspect, emission reductions such as nonpoint source pollution caused by innovative management policies, standards or investment in infrastructure construction can be collected by the government. The aforementioned emission reduction amount of nonpoint source pollution can be allocated to industrial point source pollution. When the emission rights is optimized and allocated, an optimal allocation method of emission rights based on an entropy weight method can be established, and an allocation method based on performance evaluation and an allocation method based on performance optimization can be combined. By comprehensively considering the status of regional ecological environment carrying capacity and an economic output performance level of emission rights of the enterprise, requirements of regional total emission control and water environment quality management can be satisfied, therefore promoting research and development of advanced emission control and environmental protection management technology, taking into account fairness and efficiency, and ensuring the maximum output of economic benefits of emission rights.

Integrated carbon-based organic fertilizers may be used to replace chemical fertilizers. Intelligent irrigation water and fertilizer coupling technology, and ecological ditch intercepting nitrogen and phosphorus technology are used to achieve comprehensive control of nitrogen and phosphorus loss from nonpoint source pollution in the planting industry. Through a nonpoint source emission reduction accounting module and an emission rights reserve module, the emission rights of nonpoint source pollution from the planting industry are optimized and allocated to industrial point source pollution. Finally, an integrated water environment management and high efficient co-governance system for basins is established, to manage water body quality, coordinate control of point and nonpoint source pollution, reduce pollution emission reduction costs, and improve environmental resource benefits. Therefore, the flexibility of the emission rights transaction market can be fully utilized to solve the problem of limited potential for industrial point source emission reduction currently. In addition, the maximum emission reduction from nonpoint source pollution with the optimal emission reduction cost is achieved. It not only solves the problem of the difficulty in exploring the potential of industrial point source emission reductions in the current region, but also realizes the maximum emission reduction of non-point source with the optimal emission reduction cost. On the basis of ensuring the improvement of water environment quality, the implementation of regional strategic emerging industries and people's livelihood projects are ensured; and the continuous emission reduction of nonpoint source pollution and the construction of a dynamic monitoring system are promoted through industrial development increments, therefore promoting environmental quality protection and high-quality economic development.

By the system of storing emission rights for point and nonpoint source pollution based on internet of things, an integrated water environment management and high efficient co-governance system for basins is established, to manage water quality, coordinate control of point and nonpoint source pollution, reduce pollution emission reduction costs, and improve environmental resource benefits. Therefore, the green development of agriculture is guaranteed and environmental capacity and resources are released, and the development of regional industries and the implementation of major livelihood projects are guaranteed. The overall benefit of society can be maximized at a lower emission reduction cost by utilizing the industrial development increments to assist nonpoint source pollution control.

In one embodiment of the system of storing emission rights for point and nonpoint source pollution based on internet of things, the monitoring device includes: a monitoring point setting component, a monitoring project determination component, and a monitoring frequency determination component.

The monitoring point setting component is configured to: set up monitoring points at a position where runoff of the agricultural nonpoint source pollution enters pollutant-holding water body, for different land usage type units; set up monitoring points at a position where the runoff of the agricultural nonpoint source pollution enters pollutant-holding water body, for sub-catchment areas; and mark monitoring points on an electronic map. The monitoring points are set up according to principles of representativeness, scientificity and convenience.

The monitoring project determination component is configured to: determine a water quality monitoring project and a water quantity monitoring project according to characteristics of nonpoint source pollution, main pollution factors of regional surface water, a total regional emissions control index, and a target of emission rights transaction. The purpose of this step is to reflect the emission of regional nonpoint source pollution of organic matter such as nitrogen and phosphorus, and a change of an oxygen balance system in the water environment. The water quality monitoring project mainly includes conventional items and specific items. The conventional items generally include suspended solids, pH value, conductivity, $COD_{Mn}$, ammonia nitrogen, total nitrogen, and total phosphorus, etc. The specific items refer to harmful pollutants selected according to the actual situation of the region and having a greater hazard, such as heavy metals and so on. The water quantity monitoring project generally includes runoff flow, velocity and duration. A flow meter may be used in the water quantity monitoring process, and a hydrometric propeller may be used in a velocity monitoring process.

The monitoring frequency determination component is configured to: determine a monitoring frequency according to whether there is precipitation, rainfall amount, surface runoff, and a water amount period. The monitoring frequency is determined in accordance with the following three principles. The first principle is that a monitoring process is performed every time it rains since the agricultural nonpoint source pollution is caused by rainfall. The second principle is that monitoring of the rainfall amount, the surface runoff and runoff water quality during precipitation is carried out simultaneously. The third principle is that different monitoring frequencies are set during a high flow period, and during a normal and low water period. A low monitoring frequency is selected during the normal and low water period due to stable emission of runoff; and a high monitoring frequency is selected in the high water period due to long time of runoff and rapid changes in pollutant erosion with the runoff. The monitoring process should be performed more than three times before the peak of runoff; and should also be performed more than three times in a gradual decrease process in flow after the peak of runoff, to objectively reflect the changes in water quality and water quantity in the entire runoff process of the basin.

In one embodiment of the system for storing emission rights for point and nonpoint source pollution based on internet of things, the collecting and processing device includes: a data collecting component, a transmission component, and a processing component.

The data collecting component is configured to collect data on temperature, pH value, dissolved oxygen, ammonia nitrogen, total nitrogen, total phosphorus, and flow of the agricultural nonpoint source pollution.

The transmission component is configured to transmit the data on temperature, pH value, dissolved oxygen, ammonia nitrogen, total nitrogen, total phosphorus, and flow of the agricultural nonpoint source pollution to an application layer.

The processing component is configured to summarize, convert, analyze, process and display the data on temperature, pH value, dissolved oxygen, ammonia nitrogen, total nitrogen, total phosphorus, and flow of the agricultural nonpoint source pollution by means of large-scale parallel computing.

Architecture of a monitoring and data collection and processing system for agricultural nonpoint source pollution includes an application layer, a transmission layer and a perception layer. Public technologies such as security technology and network management are applied in all of the three layers, to ensure the accuracy, robustness and safety of data. The application layer is configured to summarize, convert, analyze, process and display data. The application layer includes two sublayers, that is, a supporting platform sublayer and an application service sublayer. The supporting platform sublayer provides data common basic services, such as processing, sharing and intercommunication, and resource calling interfaces for the application service sublayer; classifies and stores information obtained by the transmission layer; and processes the data by utilizing a large-scale parallel computing function. The application service sublayer realizes functions such as real-time monitoring, information management, real-time early warning and intelligent decision-making on the basis of the supporting platform sublayer. The transmission layer is configured to transmit information collected by the perception layer to the application layer safely and reliably. The perception layer is configured to reflect the comprehensive perception characteristics of internet of things, that is, to obtain, by means of various intelligent sensing devices and sensor nodes, required monitoring point information, such as data on temperature, pH, dissolved oxygen, ammonia nitrogen, total nitrogen, total phosphorus, and flow, anytime and anywhere. A monitoring system of an agricultural nonpoint source pollution based on ASP.NET+SQL SERVER has functions such as data collection, information query, and pollution load monitoring, which has complete functions, friendly interface, and good performance. The functions of the monitoring system can meet the needs of agricultural nonpoint source pollution monitoring. An RUP-based system development process has phases of requirement capture, analysis, design, implementation, and testing, and each phase is developed incrementally and iteratively. The requirement capture phase is mainly used for case modeling and collection of requirements that have a significant impact on the architecture. The analysis phase is mainly used for converting the requirements into an analysis model. The design phase is mainly used for expanding the analysis model and transforming the analysis model to feasible technical realization plans based on implementation environment. The implementation phase is mainly used for creating source codes and executable codes, as well as component modules for deployment, based on design contents. The testing phase is mainly used for verifying the work completed in the implementation phase. The Hadoop cloud computing platform is adopted in the system, the core content of which includes a distributed file system (HDFS) providing distributed storage capabilities of each node and having super data backup and fault tolerance to ensure data security. In addition, the Map-Reduce distributed computing platform is also adopted in the system. Large-scale data mining and processing by using a framework of the Map-Reduce distributed computing platform. Monitoring data collected by the perception layer is transmitted to an online monitoring platform of the monitoring system for the agricultural nonpoint source pollution, and the data is received by a data reception platform deployed on the Web server through the Hadoop cloud computing platform. The system communicates with the cloud computing platform through interfaces. Through the interfaces, the Hadoop cloud computing platform provides MapReduce computing services and data storage services, to support data storage and analysis functions of front-end applications.

In view of the fact that abnormal data, generated in a data collection process due to mechanical or human factors, may reduce the monitoring accuracy and information fusion accuracy, an improved fuzzy C-means clustering algorithm can be used to preprocess original collected data by removing the abnormal data and redundant information. Clustering center points are obtained as an integrated input sample set, which improves the accuracy. Furthermore, information fusion technology is adopted to provide different information sources related to nonpoint source pollution, thereby eliminating the redundancy and contradictions between multi-source information, forming complete perception and description of agricultural nonpoint source pollution environment, and improving the efficiency of agricultural nonpoint source pollution monitoring and response decision-making. Internet of Things is combined with cloud computing technology. The cloud computing technology, due to its powerful processing power, storage capacity and high cost performance, can solve problems such as a high operating cost, a limited service scale and limited performance in agricultural nonpoint source pollution monitoring, thereby ensuring the promotion and popularization of agricultural nonpoint source pollution monitoring.

In one embodiment of the system for storing emission rights for point and nonpoint source pollution based on internet of things, the analysis and calculation device includes: a calculation component for calculating an initial emission amount of water pollutants, a calculation component for calculating a total load of the agricultural nonpoint source pollution, and a calculation component for obtaining the emission reduction amount of the storable nonpoint source pollution of the agricultural nonpoint source pollution.

The calculation component for calculating an initial emission amount of water pollutants is configured to calculate the initial emission amount of water pollutants from the agricultural nonpoint source pollution into water body, based on a crop sown area, fertilizing amount per unit area, a pollutant loss coefficient and a pollutant inflow coefficient.

Specifically, taking total nitrogen as an example, before the implementation of agricultural nonpoint source fertilization methods, types of fertilization, and nitrogen and phosphorus terminal control and emission reduction projects, a formula for calculating the emission amount of water pollutants from the agricultural nonpoint source pollution into water body is as the following formula (8):

$$P_0 = \sum P_{ij} = \sum^m \sum^n (A_{ij} \times F_{ij} \times e_{ij} \times \lambda_{ij} \times 10^{-3}) \tag{8}$$

where:

$P_0$ is represented as a total emission amount of water pollutants from agricultural nonpoint source pollution into water body in a region, the unit of which is kg/a or t/a;

$P_{ij}$ is represented as an emission amount of water pollutants from the j-th category of crops in the i-th subarea into water body in a region, the unit of which is kg/a or t/a;

$A_{ij}$ is represented as a planting area of the j-th category of crops in the i-th subarea, the unit of which is ha or km$^2$;

$F_{ij}$ is represented as an amount of fertilizer applied per unit area of the j-th category of crops in the i-th subarea, the unit of which is kg/(ha·a) or t/(km$^2$·a);

$e_{ij}$ is represented as a pollutant loss coefficient of the j-th category of crops in the i-th subarea (%); and $\lambda_{ij}$ is represented as a pollutant inflow coefficient of the j-th category of crops in the i-th subarea.

The calculation component for calculating a total load of the agricultural nonpoint source pollution is configured to calculate the total load of the agricultural nonpoint source pollution by means of a direct measurement method or a dummy-load method.

Specifically, the direct measurement method refers to a "section method". That is, the basin is divided into multiple pollutant-holding sections corresponding to a small catchment area of the basin according to the flow change rate of the basin. The water body monitoring sections are set. A total load of the agricultural nonpoint source pollution in whole basin is calculated based on an average concentration of representative pollutants in each section and corresponding runoff by the following formula (9):

$$p = \sum_{i=1}^{n} C_i Q_i. \tag{9}$$

where:

P is represented as a total load amount of representative pollutant of the agricultural nonpoint source pollution in each monitoring section of the basin, the unit of which is kg/a or t/a;

$C_i$ is represented as an average pollution concentration of a representative pollutant in the i-th monitoring section, the unit of which is mg/L;

$Q_i$ is represented as a runoff amount monitored in the i-th monitoring section, the unit of which is m³/s;

i is represented as the i-th monitoring section in the basin; and n is represented as the total number of monitoring sections in the basin.

The above dummy-load method includes following steps. A long-term observation is performed on a pollution load of a catchment area in a land of a single land usage type in the basin. The pollution load is divided by the number of monitoring years and the area of the catchment area, to obtain a pollution load in a unit area per unit time in a land of a certain land usage type, and the unit thereof is kg/ha·a. By multiplying the pollution load in a unit area per unit time in a land of a certain land usage type by the total area of the land, a total load of the agricultural nonpoint source pollution in the land is calculated, and a formula for calculating the total load of the agricultural nonpoint source pollution in the land is as the following formula (10):

$$p = \sum_{j=1}^{m} X_j A_j \tag{10}$$

where:

P is represented as a total load amount of nonpoint source pollution (a certain pollutant) in lands of various land usage types in a catchment area of the basin, the unit of which is kg/a or t/a;

$X_j$ is represented as a unit load in a land of the j-th land usage type, the unit of which is kg/(ha·a) or t/(km²·a);

$A_j$ is represented as a total area of a land of the j-th land usage type, the unit of which is ha or km²;

j is represented as the j-th land usage type of; and m is represented as the total number of land usage types (that is, i=1, 2, 3 . . . m).

This method is mainly used for long-term estimation in a relatively stable regional environment. It should be avoided that a single event is used to estimate the unit load. Different unit loads are determined in different regions based on actual survey and analysis results. The unit load of a certain area cannot be extended to other areas. The dummy-load method is mainly used to basins having a large area, many sub-catchments and poor monitoring conditions.

The calculation component for obtaining the emission reduction amount of storable nonpoint source pollution of the agricultural nonpoint source pollution is configured to obtain the emission reduction amount of storable nonpoint source pollution of the agricultural nonpoint source pollution by subtracting the total load of the agricultural nonpoint source pollution from the initial emission amount of water pollutants.

Specifically, to ensure continuous improvement and stable compliance with the standard of regional surface water environment quality, differentiated collection and storage combined with the regional water environment carrying capacity is performed. For an overload area of water environment carrying capacity, the storable ratio is set according to the overload situation. The emission reduction amount of the storable nonpoint source pollution of the agricultural nonpoint source pollution and the storable ratio are calculated as shown in following formulas (11) and (12):

$$P_{sa} = \beta \times (P_0 - P) \tag{11}$$

$$\beta = \begin{Bmatrix} 1 \\ C_0/C_1 \end{Bmatrix} \begin{matrix} C_1 \leq C_0 \\ C_1 > C_0 \end{matrix} \tag{12}$$

where:

$P_{sa}$ is represented as an emission reduction amount of a storable nonpoint source pollution in a region, the unit of which is kg/a or t/a;

β is represented as a storable ratio of an emission reduction amount of agricultural nonpoint source;

$C_0$ is represented as an allowable emission capacity into a river or pollutant holding capacity in a region, the unit of which is kg/a or t/a; and $C_1$ is represented as an actual emission amount into river or current situation of sewage discharge, the unit of which is kg/a or t/a.

In one embodiment of the system for storing emission rights for point and nonpoint source pollution based on internet of things, the adding device includes an adding component and an allocation component.

The adding component is configured to add the emission reduction amount of storable nonpoint source emission reduction to current reserve emission rights of the regional emission rights storage system, add an initial allocation reserve of emission rights to surplus emissions rights of industrial point source pollution repurchased by the government, to obtain updated reserve emission rights of the regional emission rights storage system.

The reserve emission rights of the regional emission rights storage system is calculated according to the following formula (13):

$$E_r = E_{r0} + E_{bi} + P_{sa} \tag{13}$$

where:

$E_r$ is represented as the reserve emission rights of the regional emission rights storage system, the unit of which is kg/a or t/a;

$E_{r0}$ is represented as an initial allocation reserve of emission rights, the unit of which is kg/a or t/a;

$E_{bi}$ is represented as surplus emission rights of industrial point source pollution repurchased by the government, the unit of which is kg/a or t/a; and $P_{sa}$ is represented as the emission reduction amount of storable nonpoint source pollution in a region, the unit of which is kg/a or t/a.

The allocation component is configured to subtract a regional annual emission reduction task from the reserve emission rights of a regional emission rights storage system, to obtain a result; multiply the result by (1−§) to obtain a dynamic allocable amount of the regional emission rights, where § is an adjustment coefficient of reserve emission rights storage amount; and allocate the dynamic allocable amount of the regional emission rights to the industrial point source pollution.

Specifically, the dynamic allocable amount of the regional emission rights is calculated according to the following formula (14):

$$Q_0 = (E_r - P_d) \times (1 - \S) \qquad (14)$$

where:

$Q_0$ is represented as the dynamic allocable amount of the regional emission rights in a planning period, the unit of which is kg/a or t/a;

$P_d$ is represented as a regional annual emission reduction task in a current year, the unit of which is kg/a or t/a; and § is represented as an adjustment coefficient of reserve emission rights storage amount, which is usually 2%-5% in combination with the regional industrial development plan in consideration of guarantee of major and urgent people's livelihood projects in the region.

Figure 4:
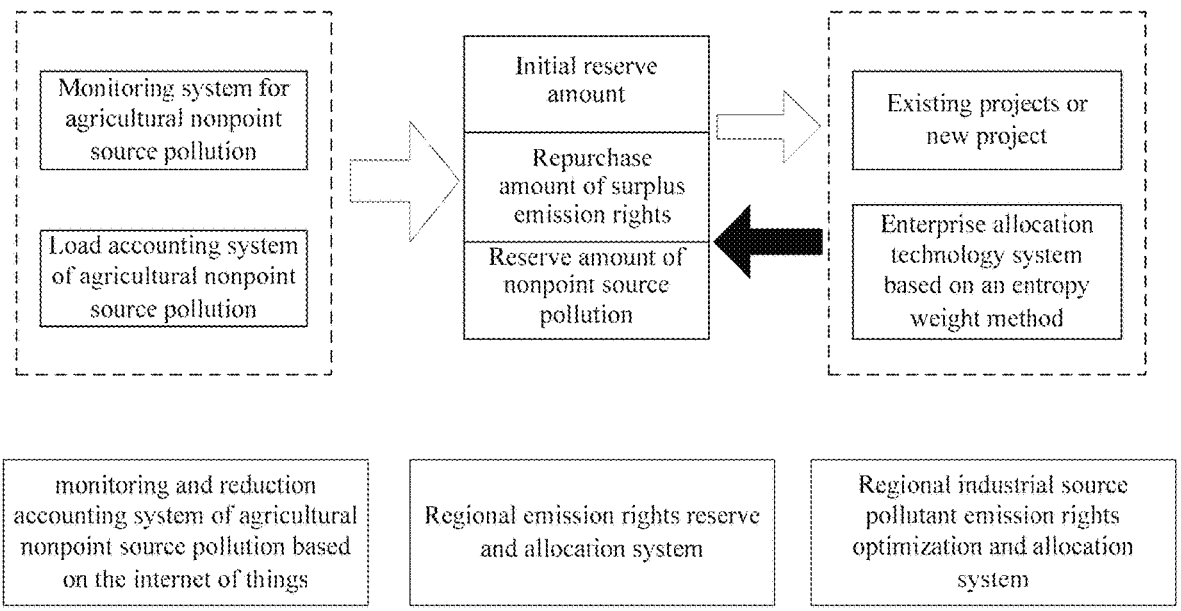
FIG. 4 is a schematic diagram of a system for storing emission rights for point and nonpoint source pollution based on internet of things according to an embodiment of the present disclosure.

As shown in FIG. 4, a monitoring and reduction accounting system of an agricultural nonpoint source pollution based on internet of things includes a monitoring system of the agricultural nonpoint source pollution and a load accounting system of the agricultural nonpoint source pollution. A regional emission rights reserve and control system includes an initial reserve amount, a repurchase amount of surplus emission rights, and a reserve amount of nonpoint source pollution. A regional industrial source pollutant emission rights optimization and allocation system includes an enterprise allocation technology system based on an entropy weight method for an existing project or new project.

Figure 5:
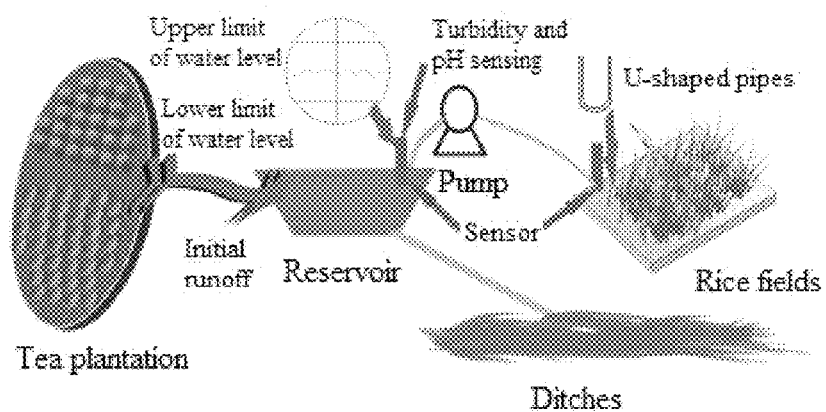
FIG. 5 is a schematic diagram of a system for storing emission rights for point and nonpoint source pollution according to an embodiment of the present disclosure.

The technical solutions of the present disclosure will be described below by taking an example illustrated in FIG. 5. FIG. 5 shows a tea plantation, a reservoir, a pump, a sensor, rice fields, ditches and U-shaped pipes. An initial runoff of the tea plantation can flow into the reservoir, and then the water level in the reservoir can be controlled to be between the upper limit and the lower limit of the water level. The turbidity and pH of water in the reservoir are sensed by the sensor, and the water is determined to be discharged into the rice fields or ditches. The aforementioned method and system will be described in details in the following.

I. Implementation of Nonpoint Source Pollution Reduction

In view of the nonpoint source pollution of the planting industry in an area A, the nonpoint source pollution reduction is implemented by a source fertilization reduction module, a process control module, and a pollution terminal prevention and control module respectively. The implementation of the nonpoint source pollution reduction mainly includes the following steps.

In one step, agricultural waste such as straw is utilized to make biomass charcoal, and fresh chicken manure and sheep manure are used as main materials to make carbon-based organic fertilizer. The appropriate fertilization rate is determined according to the soil nutrient status and crop planting type. Generally, the fertilization rate for farmland (the tea plantation in FIG. 5) is 300 kg/mu to 400 kg/mu. The fertilization rate for dry land can appropriately increase, and the fertilization rate for paddy field can appropriately reduce. Single-season crops can be fertilized 1-2 times and keep this fertilization frequency for 2-3 years. When carbon-based organic fertilizer is used as a base fertilizer, it is best to dig it into the soil thoroughly and mix it with the soil as evenly as possible. When it is used as a top dressing, it can be fertilized in a furrow. Carbon-based organic fertilizer can be mixed with chemical fertilizers, or applied separately, which can replace 20% to 40% of chemical fertilizers when used as fertilizers instead of chemical fertilizers. By combining with the regulation standards of the water level in different growth periods of crops, the water level in the field is monitored timely. When the water level reaches the lower limit of the control standard, the valve will automatically open for timely irrigation. The irrigation water comes from the runoff-collected pond (the reservoir in FIG. 5). When irrigation is needed, water is pumped directly from the reservoir into the farmland (the rice field in FIG. 5).

In another step, ecological measures with engineering property, such as ditches transformation, construction of control gates, interception dams, nitrogen and phosphorus removal devices, aquatic plants, and ecological floating bed, are performed, to restore and reconstruct the ditch ecosystem, so as to intercept, adsorb, deposit, transform, degrade, and absorb pollution such as nitrogen and phosphorus from farmland and surface runoff.

When a flow rate is designing for nitrogen and phosphorus interception technology in the ecological ditch, the water level of the lower ditch is required to be lower than the water level of the upper ditch by 0.15 m to 0.25 m; a height of a holding-water sill is required to be 10 cm to 20 cm higher than the bottom of the ditch. Porous materials with strong water permeability are used to construct ecological permeable dam at the end of the main ditch, and the height of the dam should not exceed 35% of the depth of the ditch. Wet or aquatic plants should be planted on the crest of the dam, and permeable materials should be used for natural filming and water purification. It is required that the ecological interception ditch is provided with more than one sediment capture well installed at the upstream position of water barriers, permeable dams and other structures. The depth of the well is less than 1 meter, and the width of the well is generally greater than the width of the bottom of the ditch. The length of the well is greater than 1 meter. The nitrogen and phosphorus removal module should be installed at the bottom of the trench for every 0.5 meter, and a removable grille is installed at the wellhead.

When the drop between the end of the ecological interception ditch and the discharge area is greater than 1 meter, a stepped interception pool or slope drop shall be set up, and the stepped interception pool shall be set to be at least the second level. The ecological interception ditch is required to optimize the ecological landscape structure of the ditch, dredge silt, removing debris and invasive alien plants, strengthening side slopes, and reasonably configuring more than three aquatic plants.

II. Nonpoint Source Pollution Emission Reduction Monitoring and Emission Reduction Accounting 1. Monitoring System The monitoring engineering of the agricultural nonpoint source pollution can realize automatic monitoring of water quality changes, and timely grasping water quality of the monitoring unit. The main units and parameters of the monitoring system are shown in the following Table 1.

TABLE 1

| Main Unit | Parameter |
| --- | --- |
| Sensor | Two multi-parameter controllers (MUC-200) |
|  | Two pH sensors (PPH-500A) |
|  | Two conductivity sensors (PEC-500A) |
|  | Two fluorescence dissolved oxygen sensor (PFD0-800) |
|  | Two turbidity sensors (PTU-800) |
| Analyzer | Two total phosphorus online automatic detectors (KT-08) |
|  | Two total nitrogen online automatic detectors (KT-0980) |

TABLE 1-continued

| Main Unit | Parameter |
|---|---|
| Unit | Two ammonia nitrogen analyzers (KT-0921)<br>Two permanganate index analyzers (KT-08)<br>Two auxiliary units<br>Two control units<br>Two accessory units |
| Integrated component | Two sets of customized flow cell, water supply and drainage pipelines, and control units |
| Camera | Two |
| Farmland area | Size: 5340 mm * 3840 mm * 2800 mm |
| water quality monitoring station | Foundation: C25 concrete foundation, size: 5500 mm * 4500 mm |

2. Monitoring Plan 2.1 Monitoring Project

Water quality and hydrological data are monitored at monitoring points for subsequent verification. Water quality monitoring project includes water temperature, suspended solids, pH value, dissolved oxygen (DO), potassium permanganate index ($COD_{Mn}$), ammonia nitrogen ($NH_3$—N), total nitrogen (TN), and total phosphorus (TP).

Hydrological monitoring project includes: flow direction, speed, flow.

2.2 Monitoring Frequency

Considering the timing of rainfall runoff, the initial rainfall runoff generally has severe pollution, and the subsequent rainfall runoff has a gradually reduced pollution. Therefore, the monitoring frequency in the initial stage of rainfall is high, and the monitoring frequency in a subsequent stage of rainfall is gradually decreased. It requires to be synchronized in all points, and the monitoring frequency is set as follows.

(1) Hydrological monitoring and water quality sampling are performed at 0 min, 10 min, 20 min, 30 min, 45 min and 60 min, respectively (starting at the beginning of the initial rainfall runoff, a total of 8 times).

(2) in a time period from 60 min after the initial runoff is formed to the end of the runoff or the stable runoff, one hydrological monitoring and one water quality sampling are performed every 30 min (the sampling time interval can be between 10 min to 30 min), until 4 hours after the end of the rainfall.

2.3. Monitoring Results and Emission Reduction Accounting

The three control units in engineering demonstration area such as the rice field, the orchard, and the vegetable field have significant emissions effects on the loss of total nitrogen and total phosphorus during different time points during the engineering operation.

In 12 rainfalls and 12 rainfall producing runoff events, each control unit in the rice field is decreased in total ammonia nitrogen, nitrogen, total phosphorus in the runoff, being decreased by 25% to 81% with respect to the control group, with an average emission reduction of 42%. For the rice field control unit, in which ecological ditch and carbon-based organic fertilizer are applied, the total nitrogen emission reduction in the runoff is most significant and reaches 45% to 82%. The total phosphorus emission reduction in the runoff of each orchard control unit is most significant, being decreased by 21% to 87% respect to control group, with an average emission reduction of 44%. The control unit of each vegetable field is administered by carbon-based organic fertilizer, and the total nitrogen emission reduction is decreased by 22% to 44% with respect to the control group, with an average emission reduction of 32%; and the total phosphorus concentration is reduced by 19% to 41%, with an average emission reduction of 31%.

Based on the water quality monitoring results of The nitrogen and phosphorus removal device and the interception transformation pool in the nitrogen phosphorus ecological interception ditch, the ditch-bottom interception module had good effect on the ammonia nitrogen and phosphate removal of the runoff, and the removal rate of the nitrogen and the phosphate in first four weeks is greater than 41%.

III. Emission Reduction Reserve and Distribution for Nonpoint Source Pollution

Assuming that a water environment carrying capacity state of a region M is not overloaded, accounting results according to the emission reduction monitoring of the demonstration region nonpoint source pollution includes: the emission reduction amount of the storable nonpoint source pollution of ammonia nitrogen 2.83 tons/year, total nitrogen 41.5 tons/year, and total phosphorus 4.70 tons/year respectively. An optimized allocation process based on the entropy weight method is performed in accordance with this method. The allocated objects include a new enterprise A, and expansion enterprises B and C. The three companies all belong to the textile printing and dyeing industry. The emission rights allocation optimization distribution technology based on the entropy weight method is utilized to allocate the industrial point source pollution of ammonia nitrogen in region M. The results show that the total output value in this region is increased from 16.25 billion yuan to 18.92 billion yuan, with an increase of 16.4%, and a total tax is increased from 0.69 billion yuan to 0.82 billion yuan, with an increase of 18.9%, and the economic benefits of this region is increased effectively.

In summary, the system for storing emission rights for point and nonpoint source pollution based on internet of things is used at the typical demonstration region M. Through the implementation of agricultural nonpoint source of "source reduction—process control—end reduction blocking control" engineering, by replacing chemical fertilizer with the integrated carbon-based organic fertilizers, using intelligent irrigation water fertilizer combination process and ecological ditch intercepting the nitrogen and phosphorus process, comprehensive control of pollution of the facial source in planting industry can be implemented. The emission rights of the nonpoint source pollution in the planting industry is allocated to the point source pollution in industry in the region M by the nonpoint source pollution emission reduction accounting module and the emission rights reserve module, to finally establish a high environmental resource efficiency comprehensive management and treatment system with a regional water quality target management, point and nonpoint source pollution cooperative control, and high environmental efficiency.

The above embodiments are described for those skilled in the art to implement or use the present disclosure. Many modifications made to these embodiments will be apparent to those skilled in the art, and the general principles defined herein can be implemented in other embodiments without departing from the spirit or scope of the present disclosure. Accordingly, the present disclosure will not be limited to the embodiments shown herein, but rather consistent with the widest range of principles and novel features disclosed herein.

The invention claimed is:

1. A method for storing emission rights for point and nonpoint source pollution based on internet of things, comprising:

monitoring agricultural nonpoint source pollution based on internet of things;

collecting and processing monitoring data of the agricultural nonpoint source pollution;

analyzing data on migration of the agricultural nonpoint source pollution, and calculating an emission reduction amount of storable nonpoint source pollution of the agricultural nonpoint source pollution; and adding the emission reduction amount of storable nonpoint source pollution to a regional emission rights storage system as reserve emission rights, wherein the monitoring agricultural nonpoint source pollution based on internet of things comprises:

setting up a monitoring point at a position where runoff of the agricultural nonpoint source pollution enters pollutant-holding water body, for different land use type units; setting up a monitoring point at a position where the runoff of the agricultural nonpoint source pollution enters water body, for sub-catchment areas, and marking the monitoring points on an electronic map;

determining a water quality monitoring project and a water quantity monitoring project according to characteristics of nonpoint source pollution, main pollution factors of regional surface water, a total regional emissions control index, and a target of emission rights transaction; and determining a monitoring frequency according to whether there is precipitation, rainfall amount, surface runoff amount, and a water amount period, and wherein the analyzing data on migration of the agricultural nonpoint source pollution, and calculating an emission reduction amount of storable nonpoint source pollution of the agricultural nonpoint source pollution comprises:

calculating an initial emission amount of water pollutants from the agricultural nonpoint source pollution into water body, based on a crop sown area, fertilizing amount per unit area, a pollutant loss coefficient and a pollutant inflow coefficient;

calculating a total load of the agricultural nonpoint source pollution by means of a direct measurement method or a dummy-load method; and obtaining the emission reduction amount of storable nonpoint source pollution of the agricultural nonpoint source pollution, by subtracting the total load of the agricultural nonpoint source pollution from the initial emission amount of water pollutants.

2. The method for storing emission rights for point and nonpoint source pollution based on internet of things according to claim 1, wherein the collecting and processing monitoring data of the agricultural nonpoint source pollution comprises:

collecting data on temperature, pH value, dissolved oxygen, ammonia nitrogen, total nitrogen, total phosphorus, and flow of the agricultural nonpoint source pollution;

transmitting the data to an application layer; and summarizing, converting, analyzing, processing and displaying the data by means of large-scale parallel computing.

3. A system for storing emission rights for point and nonpoint source pollution based on internet of things, comprising:

a monitoring device configured to monitor agricultural nonpoint source pollution based on internet of things;

a collecting and processing device configured to collect and process monitoring data of the agricultural nonpoint source pollution;

an analysis and calculation device configured to analyze data on migration of the agricultural nonpoint source pollution, and calculate an emission reduction amount of storable nonpoint source pollution of the agricultural nonpoint source pollution; and an adding device configured to add the emission reduction amount of storable nonpoint source pollution to a regional emission rights storage system as reserve emission rights, the monitoring device comprises:

a monitoring point setting component configured to set up a monitoring point at a position where runoff of the agricultural nonpoint source pollution enters water body, for different land use type units; set up a monitoring point at a position where the runoff of the agricultural nonpoint source pollution enters water body, for sub-catchment areas; and mark the monitoring points on an electronic map;

a monitoring project determination component configured to determine a water quality monitoring project and a water quantity monitoring project according to characteristics of nonpoint source pollution, main pollution factors of regional surface water, a total regional emissions control index, and a target of emission rights transaction; and a monitoring frequency determination component configured to determine a monitoring frequency according to whether there is precipitation, rainfall amount, surface runoff amount, and a water amount period, and wherein the analysis and calculation device comprises:

a calculation component for calculating an initial emission amount of water pollutants, configured to calculate the initial emission amount of water pollutants from the agricultural nonpoint source pollution into water body, based on a crop sown area, fertilizing amount per unit area, a pollutant loss coefficient and a pollutant inflow coefficient;

a calculation component for calculating a total load of the agricultural nonpoint source pollution, configured to calculate the total load of the agricultural nonpoint source pollution by means of a direct measurement method or a dummy-load method; and a calculation component for obtaining the emission reduction amount of storable nonpoint source pollution of the agricultural nonpoint source pollution, configured to obtain the emission reduction amount of storable nonpoint source pollution of the agricultural nonpoint source pollution by subtracting the total load of the agricultural nonpoint source pollution from the initial emission amount of water pollutants.

4. The system for storing emission rights for point and nonpoint source pollution based on internet of things according to claim 3, wherein the collecting and processing device comprises:

a data collecting component configured to collect data on temperature, pH value, dissolved oxygen, ammonia nitrogen, total nitrogen, total phosphorus, and flow of the agricultural nonpoint source pollution;

a transmission component configured to transmit the data to an application layer; and a processing component configured to summarize, convert, analyze, process and display the data by means of large-scale parallel computing.

* * * * *